United States Patent [19]

Kromrey

[11] Patent Number: 4,880,688

[45] Date of Patent: Nov. 14, 1989

[54] BREATHER MATERIALS FOR HIGH PRESSURE MOLDING

[75] Inventor: Robert V. Kromrey, Campbell, Calif.

[73] Assignee: United Technologies Corporation, Hartford, Conn.

[21] Appl. No.: 289,111

[22] Filed: Dec. 23, 1988

Related U.S. Application Data

[62] Division of Ser. No. 138,739, Dec. 28, 1987.

[51] Int. Cl.$^4$ .................................................. B32B 5/16
[52] U.S. Cl. ................................. 428/141; 425/388; 425/405.1; 428/240; 428/241; 428/242; 428/283
[58] Field of Search ........................... 425/388, 405.1; 428/141, 240, 241, 242, 283

[56] References Cited

U.S. PATENT DOCUMENTS 4,243,368  1/1981  Garabedian ...................... 425/405.1
4,714,424  12/1987  Kinugasa et al. .................. 425/388

Primary Examiner—William J. Van Balen

[57] ABSTRACT

Breather layers particularly adapted for use for removing fluids from articles during molding, that retain fluid paths at high pressures. Polymer containing articles are molded using a breather layer that is substantially capable of maintaining a fluid path under pressures up to about 20.7 MPa. The method comprises transferring pressure via a gas impervious layer to the article. The breather layer is disposed between the article and the gas impervious layer and provides a fluid path for removing fluids from the article. An exemplary breather layer comprises at least two flexible layers of beads that are dimensionally stable at pressures up to about 20.7 MPa. These breather layers facilitate high pressure molding by maintaining a sufficient fluid path size so that volatiles can be easily vented. This results in stronger, denser composite articles.

8 Claims, 2 Drawing Sheets

BREATHER MATERIALS FOR HIGH PRESSURE MOLDING

This is a division of copending application Ser. No. 138,739 field on Dec. 28, 1987.

DESCRIPTION

1. Technical Field

The field of art to which this invention pertains is molding apparatus and methods and particularly breather materials and methods of using same.

2. Background Art

A class of materials, called breathers, are used as molding aids when composite materials are formed under heat and pressure. For example, they are used to remove volatile reaction products from a class of materials called condensation cure resins. The volatiles may be water, alcohols, phenol, or other low boiling point by-products. These have to be removed, as formed, to prevent gas build-up and voids when the volatiles are trapped within the part. Very high internal pressures can occur if the volatile products are not removed properly. It is possible to have internal gas pressures which are higher than the molding pressure being used to form the molded article.

Another reason for use of breathers is to maintain a high pressure differential between the pressurizing means and the article being molded. Breathers work in conjunction with a vacuum bag which is used to form an impervious barrier between the pressurizing means and the article. A vacuum bag and breather combination is also often used with resins which do not release significant volatiles, because even a small amount of trapped gas can deleteriously affect some materials.

Breather materials for moderate temperatures are commonly composed of nonwoven polyester filaments (e.g., polyester) in a loose mat-like material. Filaments in these blanket-like materials are disposed in a random manner but are principally in a plane normal to the surface of the goods. Glass breathers are often used at higher operating temperatures. They are usually obtained in the form of fibrous fabric. Commercial fabric is composed of yarns containing several thousand filaments which are plied, twisted, and woven. Other fibrous materials have been used, but their construction is similar.

Breathers function by allowing the volatiles to pass between the individual fibers in the bundles. The presence of cross fibers is often a problem, because they interfere with the passage of gases when they are highly compacted. When severe compaction occurs at high pressures, filaments are crushed resulting in poor volatile transfer.

Accordingly, there has been a constant search in this field of art for breather materials.

DISCLOSURE OF THE INVENTION

This invention is directed to breather layers, particularly adapted for use for removing fluids from articles during molding, that retain fluid paths at high pressures. The breather layer comprises at least two flexible layers of beads that are dimensionally stable at pressures up to about 20.7 MPa.

Yet another aspect of this invention is a method of molding a polymer containing article using a breather layer that is substantially capable of maintaining a fluid path under pressures up to about 20.7 MPa. The method comprises transferring pressure via a gas impervious layer to the article. The breather layer is disposed between the article and the gas impervious layer and provides a fluid path for removing fluids from the article.

These breather layers facilitate high pressure molding by maintaining a sufficient fluid path size so that volatiles can be easily vented. This results in stronger, denser composite articles.

The foregoing and other features and advantages of the present invention will become more apparent from the following description and accompanying drawing.

BEST MODE FOR CARRYING OUT THE INVENTION

Figure 1:
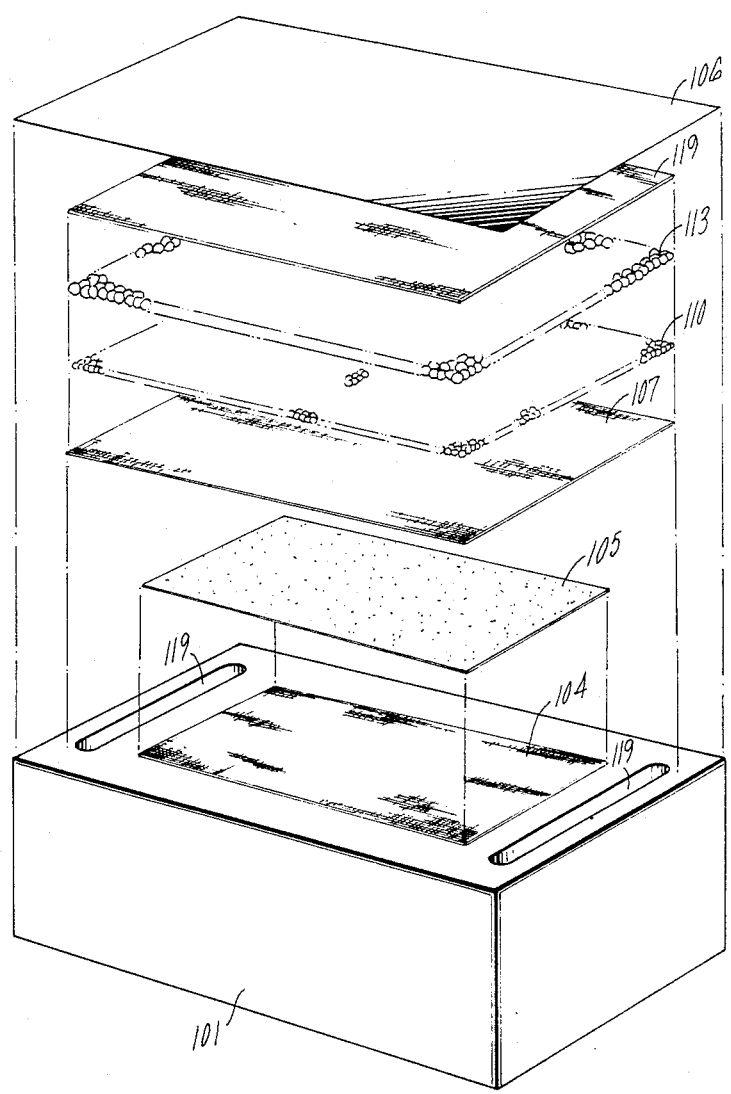
FIG. 1 illustrates an exploded perspective view of a composite during molding conditions using an exemplary breather material of this invention.

A clearer understanding of this invention may be had by reference to FIG. 1. An article 104 to be molded (e.g., prepreg) is disposed next to a tool 101 (e.g., steel, copper, aluminum form). A layer of release fabric 105 may be disposed between the prepreg and subsequent layers to facilitate separation of the composite subsequent to molding. A thin porous fabric layer 107 may be disposed next to the article 104 to aid in achieving a smooth surface when the article 104 is pressurized. In addition, a layer of small beads 110 may be disposed next to the thin fabric layer to aid in achieving a smooth article surface. A layer of larger beads 113 is disposed next to the smaller bead layer 110 and serves as the main lateral fluid flow path for liquids, vapors, and gases as they are drawn to the vent 119 in the tool 101. A bag 106 envelops the assembly. A layer of glass fabric 119 or other porous breather material may be disposed between the larger beards 113 and the bag 116 in order to protect the bag 116 from rupturing. Under pressure the article 104 is cured but the fluid flow path particularly in the lateral direction is not obstructed.

Any porous material whose voids withstand pressures of up to about 2.07 Ma (300 psi) to about 20.7 MPa (3000 psi) and higher may be used as the breather materials of this invention. It is preferred that the porous barrier layer's voids have a mean size volume of at least about 0.003 mm$^3$ (0.0000002 in.)$^3$. This ensures an uninterrupted venting path which is capable or removing fluids from conventional composite materials during molding. It is also preferred that the voids are substantially interconnected. The breather layer should be nonsupporting. By that is meant that it does not serve as the supporting frame or body (e.g., tool) for the part to be molded. It is also preferred that the breather layer is flexible as this facilitates the forming of the breather layer around composite prepreg surfaces having curves, bends and corners. Preferably, the material is capable of transferring a substantially uniform pressure (e.g., pressure differentials less than about 10%) when used in conjunction with the solid flowable media described hereinafter. It is also preferred that the breather layer is thermally stable at temperatures of about 316° C. to about 1371° C. and higher to ensure integrity of the breather layer for molding composites at high temperatures. If it is not thermally stable, the breather layer may soften and not transmit fluids during high temperature molding and may even damage the composite. The breather layer may also be thermally insulative or thermally conductive depending on the application. Thus, it may be desired to protect the pressurizing means (e.g. solid flowable polymer media described hereinafter) or to transfer heat to the article to be molded from the pressurizing means.

It is preferred that the breather layer is about 0.2 cm to about 1.0 cm in thickness because below 0.2 cm, the layer becomes too thin to be effective over large areas. The desired thickness is a function of the amount of volatiles to be removed and the amount of surface area of the part, etc. It is also preferred that the breather layer be relatively uniform in thickness to ensure uniform pressure application.

A preferred breather layer comprises at least two layers of substantially spherical beads that are joined together to form an integral structure. By substantially spherical is meant an aspect ratio of less than 2. Two layers ensure an open fluid path that is parallel to the article to be molded (e.g., between the two layers). Three layers provide even greater assurance of an open fluid path. Spherical particles, such as glass beads, serve this purpose well. Conventional beads can withstand compression loadings of 525 MPa (75,000 psi). Beads remain spherical at very high pressures and their void volume remains relatively constant.

The size of uniform beads has no bearing on the total void volume, only on the size of the cavities. The size of the aperture is also affected, and is in direct proportion to bead size. Increased void volumes are a significant benefit for breather materials. Not only are the cavities between bead cavities increased, but the apertures (openings) between beads are much larger. Theoretical close packing of beads is based on several models. Void volumes for several models are as follows: face-centered cubic—26%; hexagonal close packed 26%; and body centered cubic—32%. For real world applications, beads settle in a random mix of packing patterns. In addition, slight movements of packs result in changes to packing patterns. Also, because beads are rarely perfectly round, void volumes are increased. Thus, typical commercially manufactured beads have a void volume of about 30% to about 40%, typically about 37% when they are all nearly the same size. The size of the beads is an important factor which determines the effective pore size for removal of volatiles. Although the actual void volume is not changed, the interstices are more easily plugged when the beads become too small. Thus, it is preferred that the beads 113 are about 0.5 mm to about 3.5 mm in diameter.

It is also preferred that at least one layer of very small size beads 110 is disposed near the article to be molded. This layer would follow the filling of the irregular large bead surface 113 with the smaller beads to form a reasonably smooth surface. This aids in attaining a smooth surface on the molded part. The larger the beads that are near the molded part, the greater the chance the molded part surface may have a dimpled look. It is preferred that this bead layer is about 0.5 mm to about 1.7 mm because below about 0.5 mm, the flow path can become plugged and above about 1.7 mm, the surface of the part is typically nonuniform (e.g., dimpled), although the part can be machined to provide a smooth surface.

In addition, a thin layer of fabric 107 (e.g., #1581 breather (Airtech International, Carson, CA) typically about 0.2 mm (0.009 inches) to about 0.6 mm (0.027 inches) in thickness may be disposed between the beads and the article to be molded. This aids in attaining a smooth part surface. Although either the small bead layer 110 or the fabric layer 107 (described above) tends to inhibit the fluid flow path, the advantages of this invention are still attained. In prior art breather materials, pressure, reduced the fluid flow path in both a normal and parallel direction to the article to be molded. According to this invention, the only fluid pathway that may be inhibited is the path normal to the part. Once the fluids have reached the larger beads 113 (a e.g., 0.8 mm (0.03 inch)) the lateral pathway is large and unaffected by pressure. Clearly, either the small bead layer 110, fabric layer 107 or a combination of both may be used depending on the particular application.

In addition, other layers may be used. For example, a layer of compliant material (e.g., glass fabric or other porous breather material) 119 may be used over the bead surface to protect vacuum bags (e.g., silicone rubber or the aluminum foil described later) from rupturing under very high pressure (e.g., 6.9 MPa (1000 psi)); especially when large beads are used. Small beads (e.g., less than 0.5 mm) may not require the glass layer.

Typically, layers of a release fabric (e.g., ARMALON (TM) Teflon coated glass available from T.M.I. Inc.; Salt Lake City, UT) may be used, for example, to facilitate release of the part from the breather material. Finally, a flexible multidirectionally flexible stretchable porous material such as tricot stretch fabric may be bonded to one or both sides of the breather layers. This facilitates the flexibility of the bead layers because as a layer of beads is bent, it distributes the bending load more uniformly over a greater area of the bead layer.

Beads may be made of materials other than glass, such as steel shot and ceramics. The glass beads may also be hollow spheres, such as microballoons, if their compressive strength is adequate for the application (e.g., pressures desired). Conventional glass beads are suitable for use at temperatures near the softening point, 816° C. (1500° F.). Special glasses will increase the use temperatures (e.g., one hundred to several hundred degrees). Exemplary glass beads are 3000 (TM) beads and 3000E (TM) beads available from Potters Industries (Hasbrook Heights, N.J.).

As was mentioned above, the beads may be used as an insulative layer in addition to their use as a breather. Both hollow beads and ceramic beads will provide additional insulation. Hollow glass, silica or ceramic spheres are excellent insulators as they are filled with gas. In addition, the void volume between the spheres provides additional insulation value which can be as much as that obtained with any within the spheres. Collectively, the total void content can be from 20% to 80% which includes the internal void volume of the spheres. Thermal conductivity of the insulation layer can be about 1 k (BTU in./hr °F. ft$^2$) with Eccospheres No. FA-B ceramic microballoons from Emmerson-Cumming (Canton, MA). In addition, the beads may be coated with either a radiation reflective or absorbing coating to aid with insulation. Exemplary reflective coatings include metallic, chrome, aluminum, nickel and copper. Reflective coatings may transform to absorptive coatings during use and thus still remain insulative (e.g. copper to copper oxide). Exemplary absorptive coatings include copper oxide, carbon black and high temperature paint. Yet another radiation blocking alternative is opaque beads. Conventional glass beads are suitable for use at temperatures near their softening point, 816° C. (1500° F.). Special glasses will increase the use temperatures (e.g , several hundred degrees). Exemplary glass beads are 3000 (TM) beads and 3000E (TM) beads available from Potters Industries (Hasbrook Heights, N.J.).

In addition, any combination of the above coated, hollow etc. beads may be used (e.g., alternate layers) depending on the desired application, cost, etc.

Typically, the layer of beads must be held in place during the molding process or at least until the molding pressure becomes sufficient to prevent their displacement. This applies to articles having vertical or curved surfaces. To facilitate layup beads can be formed into pads or rolled sheets which may be laid over the article to be molded as a blanket. The material used to contain the beads can be stitched to keep the beads from rolling into one place, with resultant bare areas. This material would resemble a quilt.

An alternate preferred method for forming the bead layer is by lightly bonding the beads together. A flexible porous pad may be formed by applying a very thin layer of flexible adhesive, for example, PSA529 (TM) acrylic modified silicone (General Electric Co., Fairfield, CT) catalyzed with A-1100 (TM) catalyst (Union Carbide, Danbury, CT) to a single layer of clean beads. Depending on the adhesive used, it may withstand the molding temperatures used. However, even if the adhesive does not withstand the molding temperature, once the beads are in place, they may be held in place by the pressurizing means used (e.g., solid flowable polymer described hereinafter. The beads are uniformly spread in a form to confine them. After air-drying, an excess of clean beads is poured onto the previous layer. This addition is made while the uncured resin is still tacky. An exemplary adhesive thickness is approximately 0.008 mm (0.0003 inches). But the adhesive may be thicker (e.g., 0.025 mm (0.001 in.)) or thinner (e.g. 0.005 mm (0.0002 in.)) as required for larger or smaller beads. Excess beads may be removed from the surface by inverting the sheet after the adhesive has dried to a good tack. Additional adhesive can be sprayed over the surface of the above-described bead layer for bonding to another bead layer. After minimal drying, more beads may be poured over the surface; the solvent allowed to evaporate, and the excess beads poured off. This technique can be repeated until the desired bead layer thickness is attained.

Yet another preferred method comprises completely coating a quantity of beads by immersion in a dilute solution of an adhesive mixture. The beads are drained and then poured into a casting frame for drying. Removal of any residual liquid may be accomplished through a porous layer of fabric under the frame. This layer is removed after the adhesive has set sufficiently to hold the beads together as a pad. After the final addition of beads, the pad is placed in a circulating air oven to cure the adhesive. The adhesive can be formulated to remain tacky enough to enable it to be a pressure sensitive stock. It is then capable of easily sticking to any surface, including itself. Layup is simplified because the pad adheres to the outside of a release layer covering the article to be molded.

Sheets (e.g., pads) of the beads are easily cut into shapes to fit over an article. The flexible cured sheets can be contoured and butt spliced to form a continuous breather layer.

The above assembly may be contained within a vacuum bag (e.g., conventional film or silicone rubber bag) or a metal foil barrier which can withstand high temperatures. The bag typically covers vent holes in the tool on which the part is being made. Although the barrier is referred to as gas impervious, small leaks may occur in a metal foil barrier, that is used with the solid flowable polymer pressure transfer media described below, without deleterious effect. Thus, gas impervious as used herein is defined as encompassing this concept. Typically, aluminum and copper foils or alloys thereof are used, depending on the maximum temperature of exposure during cure with the solid flowable polymer pressure transfer media described below. Aluminum is preferred at temperatures up to about 538° C. (1000° F.); copper may be used at temperatures between about 538° C. (1000° F.) and about 816° C. (1500° F.) when the aluminum foil would melt. Above about 816° C., high temperature alloys may be used.

These breather layers may be used in conjunction with a variety of conventional pressure causing means in order to mold an article (e.g., composite). Examples include pressure pads, autoclaves, hydroclaves and platen presses. A preferred pressure causing/transferring means is the solid flowable media and methods described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 entitled "Molding Method and Apparatus Using a Solid Flowable, Polymer Medium", the disclosure of which is hereby incorporated by reference. The preferred solid flowable polymer material is further described in U.S. Pat. No. 4,686,271 entitled "Hydraulic Silicone Crumb" by Beck et al, the disclosure of which is hereby incorporated by reference.

The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4+30$ U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. Preferred materials which have been used thus far are the experimental unfilled silicone rubber materials designated as X5-8017, formerly No. 6360 B1 (more simply 8017 hereinafter), X5-8023 and X5-8800 by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber Stauffer Chemical Company, Westport, Connecticut USA), believed to be essentially the material which is described in the Bruner U.S. Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° are 3000° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination are necessary. On the contrary, to a significant extent, it is believed there is a redundancy and that they independently characterize the invention.

Returning to the breather layers, (that may be used with the above-described pressurizing means), these layers are used in conventional processes to vent fluids from articles to be molded under pressure. Typically, pressure applied by the means described above and optionally heat is applied to the article causing fluids (gases or liquids) to be released from the article. The fluids are typically passed through the breather layer to a vent which is connected to a vacuum line. Preferably, pressures of about 0.01 MPa (15 psi) to about 21 MPa (3000 psi) are applied to the article. At pressures above about 1.7 MPa (250 psi) to about 21 MPa (3000 psi), the breather layers of this invention are particularly advantageous because they substantially maintain their fluid passage void volumes and flow paths. Optionally, the article precursor is exposed to elevated temperatures at about 121° C. (250° F.) to about 468° C. (875° F.) and even higher in order to cure the article precursor. The pressures and temperatures vary depending upon the particular article to be cured, its composition, size, etc.

Figure 2:
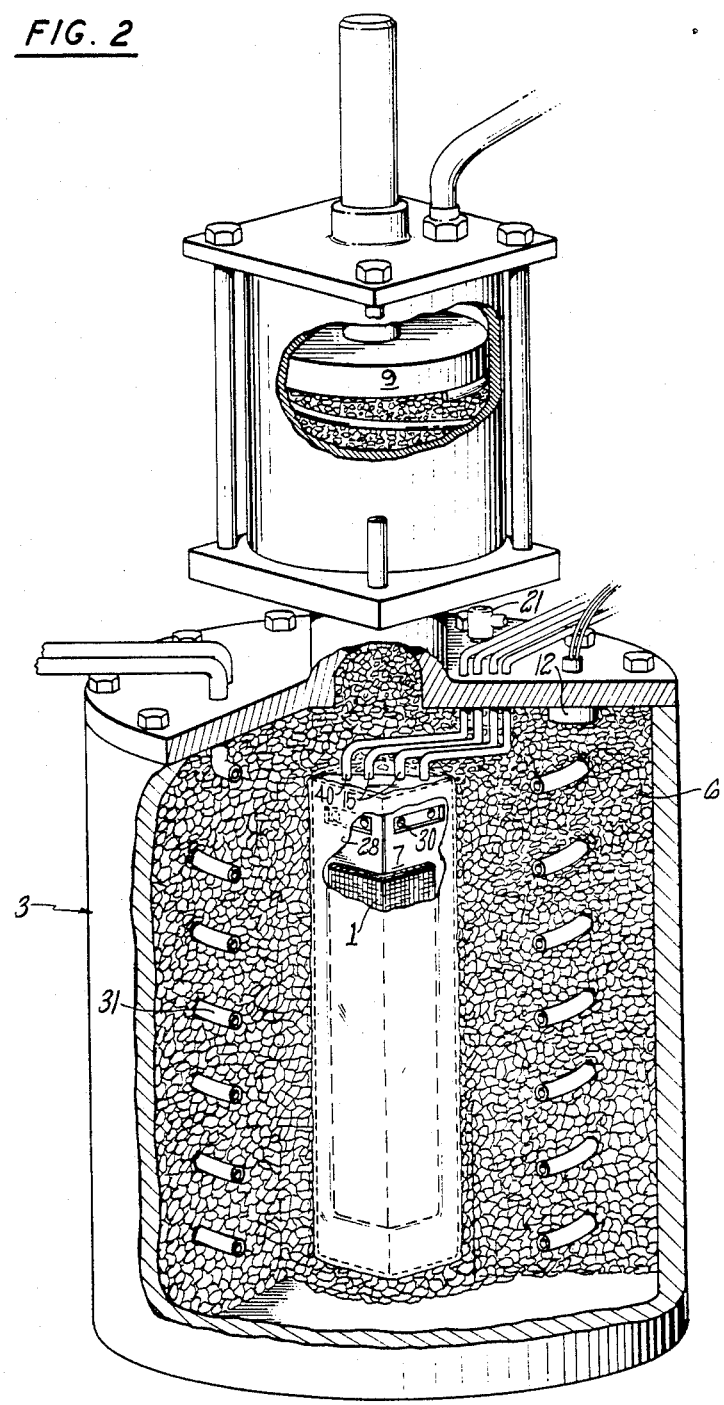
FIG. 2 illustrates a perspective view cutaway of an apparatus for performing the molding method of the present invention by controlling the temperature and pressure of the pressurizing polymer medium.

FIG. 2 illustrates an especially preferred method according to the present invention. Preimpregnated fibers or woven fabric layups are formed (e.g., by weaving, filament winding and tape wrapping) from fibers. At least two (a plurality) of the prepreg plies 1 are stacked and placed in a pressure vessel 3 (e.g., stainless steel, alloy steel) and surrounded with a polymer medium (medium) 6.

A barrier layer 28 is disposed between the medium and the article to avoid contamination of the composite and medium. Unlike a vacuum bag used with conventional autoclave processes, this layer does not have to be perfectly air tight. The pressurizing medium will close any seams in the barrier and small leaks will not deleteriously affect the process. An exemplary material is conventional aluminum foil. The barrier layer covers the breather layer of this invention described above and in FIG. 1 which is in communication with a vacuum line 40 via gas vent 30. This may be used to remove volatiles from the article. The breather may be in contact with more or less of the composite precursor as is desired. Typically, the surface area of the composite precursor 1 not in contact with the breather is disposed (e.g., in contact) next to a tool 7 in order to provide (or maintain) a particular shape to the article 1. A pressurizer (e.g., mechanical piston) 9 can apply the requisite, uniformly distributed medium pressure to the article precursor. However, the pressure is preferably accomplished via the thermal expansion of the low temperature polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3000 psi) are used. However, it is believed pressures up to 138 MPa (20,000 psi) could be used.

Resistance heaters 15 are used to form (e.g., cure, carbonize, etc.) the composite to be molded 1. By raising the temperature of the tool, the heat is transferred to the article. Preferably, a fluid heating/cooling means 31 is used to change the pressure via the large thermal expansion of the pressurizing medium. Typically, the temperature used to expand the pressurizing medium is much less than that used to cure the article precursor. Regulation of the pressure increase can be achieved through a relief valve 21, piston 9 and/or fluid heating/cooling means 31. Thus, tubing 31 can be used alternately to heat or cool the medium depending on whether hot or cold fluids are passed independently of the temperature in the cure region.

EXAMPLE 0.18 cm. diameter beads available from Potters Industries (Hasbrook Heights, N.J.) were poured into a mold to form a bead layer that was three beads thick. The bead layers were sprayed with SR529 (TM) silicone resin adhesive (General Electric Co., Fairfield, Ct.) thinned with toluene. The mold and beads were heated in an oven at 121° C. for about 30 minutes. Two bead blankets were made: one with clear beads and one with beads sprayed with ACRVOC (TM) high temperature paint.

16 ply layups were made with EYMYD (TM) resin (Ethyl Corp., Baton Rouge, La.) and AS-4 (TM) graphite fabric (Hercules, Wilmington, Del.) fabric and placed on a steel mandrel having copper faces equipped with vents to aid in the removal of volatiles. Each layup was covered with ARMALON (TM) Teflon coated glass release fabric available from TMI Inc. (Salt Lake City, UT). A layer of glass fabric was placed on the release covered layups. The above described bead blankets were placed on top of the glass fabric layers as the breather and insulation layers. The glass fabric and bead layers were in communication with the vents in the mandrel. Layers of glass fabric were placed on top of the glass beads and the assembly was covered with aluminum foil which was taped to the mandrel.

The mold assembly was covered with about 2.5 cm of 8800 polymer media and covered with an aluminum foil bag. The prepared mold assembly and polymer media was placed into a pressure vessel for processing. The vessel was filled with 8023 polymer medium. Heating was provided to the tool/mold assembly to properly cure the article. Heating and cooling were also provided to a control coil to maintain the desired pressure conditions.

The composite was cured as follows. Vacuum was applied when the temperature reached 85° C. (185° F.) to remove volatiles from the assembly. The temperature was increased to 157° C. (305° F.) and the vessel pressure was increased to 0.7 MPa (100 psi). Then the temperature was increased to 427° C. (800° F.). At 399° C. (750° F.) the vessel pressure was increased to 9.8 MPa (1400 psi). The temperature, pressure, and vacuum were maintained at 427° C., 9.8 MPa and 635 mm Hg respectively for 120 minutes. The vessel was cooled to 232° C. (450° F.) and the pressure was reduced to 0.35 MPa (50 psi) over 20 minutes. Then the vessel was allowed to reach ambient conditions. A visual inspection of the composite parts showed strong void-free parts.

These breather layers facilitate high pressure molding by maintaining a sufficient fluid path size so that volatiles can be easily vented. This results in stronger, denser composite articles. The breather layers are flexible and so conform to curved surfaces. In addition, the breather layers are dimensionally stable at high temperatures and can be made either heat conducting or insulative depending upon the desired application. An exemplary breather layer, glass beads, provide the above advantages and are inexpensive and simple to form into breather layers. The glass bead breather layers are particularly useful when used in conjunction with molding methods that use a solid flowable particulate polymer medium to transfer pressure because they may be used to transfer substantially uniform pressures.

Although this invention has been shown and described with respect to detailed embodiments thereof, it will be understood by those skilled in the art that various changes in form and detail thereof may be made without departing from the spirit and scope of the claimed invention.

I claim:

1. A breather layer particularly adapted for acting as a fluid path to remove fluids from articles during molding comprising:
   at least two flexible layers of beads said beads dimentionally stable at pressures up to about 20.7 MPa; and
   a layer of breather fabric about 0.2 mm to about 0.6 mm disposed thereon.

2. The breather layer as recited in claim 1 wherein said beads are bonded together with a flexible adhesive.

3. The breather layer as recited in claim 1 wherein said beads are about 0.5 mm to about 3.5 mm.

4. The breather layer as recited in claim 1 wherein said beads comprise glass, glass-ceramic, or ceramic or a mixture thereof.

5. The breather layer as recited in claim 1 wherein said beads are metallic.

6. The breather layer as recited in claim 1 wherein said beads are hollow.

7. The breather layer as recited in claim 1 having a layer of porous material on at least one side for providing a substantially smooth surface to said breather layer.

8. The breather layer as recited in claim 1 wherein said breather layer is capable of transferring substantially uniform pressures.

* * * * *

UNITED STATES PATENT AND TRADEMARK OFFICE
CERTIFICATE OF CORRECTION

PATENT NO. : 4,880,688

DATED : November 14, 1989

INVENTOR(S) : Robert V. Kromrey

It is certified that error appears in the above-identified patent and that said Letters Patent is hereby corrected as shown below:

Column 4, line 12, after "(a", insert --short path--.

Column 7, line 12, delete "are 3000°".

Signed and Sealed this

Twenty-eighth Day of May, 1991

Attest:

HARRY F. MANBECK, JR.

Attesting Officer

Commissioner of Patents and Trademarks